F. C. LEYPOLDT.
Button-Hole Cutter.

No. 8,713. Reissued May 13, 1879.

Witnesses.
Henry Howson Jr.
Harry Smith

Inventor.
Frederick C. Leypoldt
by his attorneys
Howson and Son

N. PETERS, PHOTO-LITHOGRAPHER, WASHINGTON, D. C.

UNITED STATES PATENT OFFICE.

FREDERICK C. LEYPOLDT, OF PHILADELPHIA, PENNSYLVANIA.

IMPROVEMENT IN BUTTON-HOLE CUTTERS.

Specification forming part of Letters Patent No. 202,446, dated April 16, 1878; Reissue No. 8,713, dated May 13, 1879; application filed November 11, 1878.

DIVISION A.

*To all whom it may concern:*

Be it known that I, FREDERICK C. LEYPOLDT, of Philadelphia, in the county of Philadelphia and State of Pennsylvania, have invented certain new and useful Improvements in Button-Hole Cutters, &c.; and I do hereby declare that the following is a full and exact description thereof, reference being had to the accompanying drawings, making a part of this specification.

My invention relates to certain novel improvements in button-hole cutters and analogous instruments.

It has for its object simplicity and economy in construction and great power of the cutting-blade.

With these objects and ends in view, my invention consists of a button-hole cutter or other analogous instrument having the lower jaw slotted or bifurcated vertically or transversely to the mouth of said jaw, and adapted to receive and guide the cutting-blade from pivot to point, as will be hereinafter more fully set forth.

My invention also consists in a novel cutting-block and the manner of its attachment, as will be hereinafter more fully set forth.

My present invention is designed to overcome some of the objectionable features found in button-hole cutters made according to Letters Patent granted to me on the 18th day of December, 1860, which, in some particulars, is of costly construction, but which, in the general features of construction, is substantially the same as my present invention. Reference is therefore made to said Letters Patent for full explanation of such like parts as may be found in both.

To enable others to make and use my improved button-hole cutters, I will proceed to describe the construction and operation of the same, referring by letters to the accompanying drawings, in which—

Figure 1:
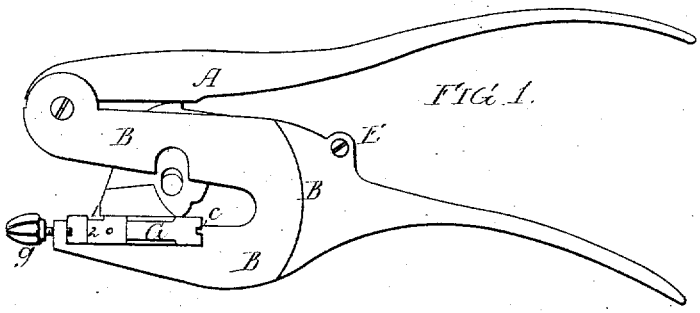
Figure 2:
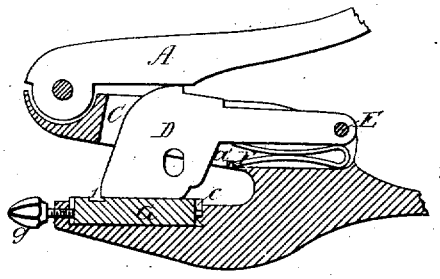
Figure 3:
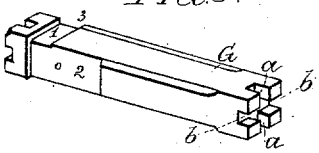

Figure 1 is a side elevation or plan view of a button-hole cutter embodying the features of my invention; Fig. 2, a similar view with the lower jaw in section and the lever-handles broken off; Fig. 3, a perspective view of the cutting-block removed; and Figs. 4 and 5, side views of modifications of my invention, showing its adaptability to wire and sheet-metal cutters, &c.

Similar letters indicate like parts in the several figures.

A represents the upper lever-handle for depressing the knife, and B the lower lever and jaw, which is bifurcated in the usual way, to admit the introduction of material to be operated upon. This jaw B is also transversely slotted at C, to admit of the introduction and vibration of the cutting-blade D, which is pivoted at the rear end by a screw, *e*, so that it may be readily removed for sharpening, &c. Within the slot C, at its rear end, is located a loose spring, F, which is held or confined in place by the check *a* and knife-blade D after the latter has been secured in position. G is a cutting-block, (seen in perspective at Fig. 3,) which is secured in place, as clearly seen in Figs. 1 and 2. The parallel surfaces or cutting-faces of said block are cut away, as seen at 1 2 3, Fig. 3, such cut-away portions varying in length to produce varying cuts in material operated upon by the knife in an obvious manner. The two ends of the block G have grooves *a b* at right angles to each other, into which enter a short teat or projection, *c*, and the thumb-screw *g*, by which the block is, when the screw is forced to position, held against displacement or movement, and the said block may be removed and readjusted to present any one of its four sides for the cutting-blade to act upon.

It will be readily seen that the cutting-blade or knife is free to vibrate within its slot within the jaw, and that, being forced down by the lever A upon the cam-face of said knife, the spring F is compressed, so that when pressure is removed the spring, forcing the knife D up, causes the lever A to be returned to its normal position. The knife is steadied and guided in its movement by the slot, and a long circular movement or leverage is obtained by reason of its being pivoted in the rear.

Figure 5:
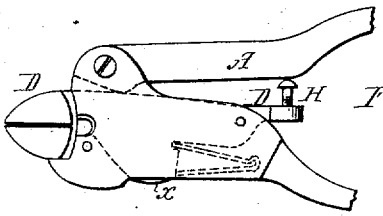

The arm or rear extension of the knife may terminate at the pivot E; or it may extend beyond that point, as seen at Fig. 5, and be provided with a set-screw, H, to limit the movement of the lever A, and thus prevent injury to the cutting-edges of the knife or knives.

Figure 4:
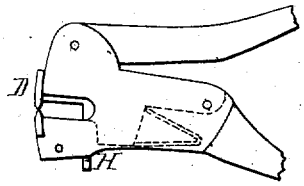

As before stated, Figs. 4 and 5 represent more particularly the application of my invention to wire and sheet-metal cutters, and these figures need not be fully described here, as they form the subject of a separate division of this reissue.

It will be seen that the slot provided for the vibrating knife is designed also to serve as a concealed cell for the reception of the spring F, which, by reason of its location and operation, may be a cheap and simple two-arm spring, being out of the way, and protected against displacement and injury.

I am aware that punches have been made with a vibrating cutter arranged within a slot in the bifurcated jaw, and having a tail extended behind the pivot and beyond the slot, and operated upon by an externally-arranged spring. I do not therefore wish to be understood as claiming such construction; but

What I claim as new, and desire to secure by Letters Patent, is—

1. A button-hole cutter having its lower bifurcated jaw provided with a slot, C, in which is formed a check, $a'$, in combination with the vibrating knife D, pivoted near its rear end, the spring F, arranged in front of the pivot, and concealed in the slot, and the lever A, all arranged to operate as and for the purposes set forth.

2. The cutting-block G, formed with intersecting grooves $a$ $b$ at either end, in combination with the teat $c$ and thumb-screw $g$, substantially as and for the purpose set forth.

In testimony whereof I have signed my name to this specification in the presence of two subscribing witnesses.

F. C. LEYPOLDT.

Witnesses:
ALEX. PATTERSON,
HARRY SMITH.